United States Patent
Chu et al.

(10) Patent No.: US 6,549,755 B2
(45) Date of Patent: Apr. 15, 2003

(54) METHOD AND APPARATUS FOR MONITORING AND CONTROLLING GAIN COMPRESSION IN A TRANSMITTED SIGNAL

(75) Inventors: Jeffrey C. Chu, Los Altos, CA (US); Michael L. Downey, Fremont, CA (US); Robert W. Estus, Woodside, CA (US)

(73) Assignee: Glowlink Communications Technology, Inc., Los Altos, CA (US)

( * ) Notice: Subject to any disclaimer, the term of this patent is extended or adjusted under 35 U.S.C. 154(b) by 0 days.

(21) Appl. No.: 10/114,373

(22) Filed: Apr. 1, 2002

(65) Prior Publication Data

US 2002/0164950 A1 Nov. 7, 2002

Related U.S. Application Data

(60) Provisional application No. 60/289,002, filed on May 4, 2001.

(51) Int. Cl.[7] ............................................... H04B 7/185
(52) U.S. Cl. .................. 455/13.4; 455/69; 455/430; 455/522; 375/345
(58) Field of Search .......................... 455/91, 126–127, 455/69, 232.1, 236.1–234.2, 239.1–240.1, 245.1, 250.1, 13.4, 522, 430; 330/278; 375/345, 225, 227, 221; 370/249

(56) References Cited

U.S. PATENT DOCUMENTS

| | | | |
|---|---|---|---|
| 4,941,199 A | | 7/1990 | Saam |
| 5,574,974 A | | 11/1996 | Almgren et al. ............ 455/33.1 |
| 5,687,195 A | * | 11/1997 | Hwang et al. ............... 375/345 |
| 5,708,681 A | * | 1/1998 | Malkemes et al. .......... 375/297 |
| 5,731,993 A | * | 3/1998 | Wachs et al. ................ 702/109 |
| 5,881,096 A | * | 3/1999 | Majkrzak et al. ........... 375/133 |
| 6,128,353 A | * | 10/2000 | Ho et al. ..................... 375/345 |

FOREIGN PATENT DOCUMENTS

EP    0 844 805 A1  *  5/1998

* cited by examiner

*Primary Examiner*—Charles N. Appiah
(74) *Attorney, Agent, or Firm*—Derek J. Westberg

(57) ABSTRACT

A method and apparatus for monitoring and controlling the operating point of a satellite transponder amplifier. In one aspect of the invention, a time domain signal received at a ground station is digitally sampled. Then, a histogram of the received signal is computed. To form the histogram, the digital samples are categorized according to which of a plurality of amplitude ranges each sample falls within. When plotted as a graph, the number of occurrences within each amplitude range forms the histogram. Under low compression levels, the histogram generally appears as an approximately bell-shaped curve. However, under higher compression levels, the bell-shaped curve becomes distorted. By correlating the acquired histogram to a template histogram, an amount of compression can be determined. This amount of compression indicates the operating point of the transponder amplifiers. If desired, the transmission power levels used by the satellite can be adjusted to ensure that the amplifiers operate at desired levels of compression. The invention has an advantage over prior techniques in that the operating point of the transponder amplifiers can be more accurately determined. As such, the operating point can be more precisely adjusted.

25 Claims, 17 Drawing Sheets

METHOD AND APPARATUS FOR MONITORING AND CONTROLLING GAIN COMPRESSION IN A TRANSMITTED SIGNAL

This application claims the benefit of U.S. Provisional Application Ser. No. 60/289,002, filed May 4, 2001.

FIELD OF THE INVENTION

The present invention relates to the field of satellite communications. More particularly, the present invention relates to the field of power monitoring and control for satellite transponders.

BACKGROUND OF THE INVENTION

A communications satellite typically operates by receiving communication signals modulated according to individual carrier frequencies from ground-based transmitters. A transponder in the satellite typically processes the signals before re-transmitting them. For example, the transponder typically amplifies and may also translate the received signals in frequency and perform filtering prior to retransmission. Ground-based receivers may then receive the re-transmitted signals.

A number of competing factors may affect the level of power used for transmission of satellite communication signals. For example, weather patterns can interfere with satellite communications. More particularly, rain can reduce the effective power of the communication signals. This is often referred to as "rain fade." Thus, in the presence of rain, signal power levels are generally required to be higher than otherwise to ensure that the signals are received reliably.

A typical satellite may have up to twenty-four or more transponders, while each transponder may handle up to one hundred or more carrier signals. Depending upon communication demands, not all of the carrier signals may be active at any one time. Thus, total power requirements can vary depending upon communication traffic levels. However, the total power available for retransmission is limited. For example, the on-board power supplies for the satellite have limited output.

In addition, the transponder amplifiers used for retransmission of the carrier signals have limited output power. More particularly, at low power levels, an amplifier may be operating in a region in which there is a substantially linear relationship between input signal power and output signal power. At higher power levels, the relationship between input signal power and output signal power becomes increasingly non-linear. This gain characteristic is illustrated in FIG. 1. As can be seen from FIG. 1, at low output power levels (e.g., below approximately 15–20 watts), the gain response is relatively linear. At higher power levels, the gain response becomes compressed. Some compression may be tolerable. Operation beyond certain levels of compression, however, is generally undesirable as the resulting signals can become corrupted, such as with excessive noise. A position on the gain characteristic at which an amplifier is operating is often referred to as its "operating point."

Thus, it is often desired to determine the operating point of a transponder amplifier in a satellite. A conventional technique involves measuring the power level of a communication signal received from the satellite at a ground station. Then, by estimating the signal attenuation between the satellite and the ground station, the power level at the satellite may be estimated. This estimated power level indicates the then-current operating point. This technique has a drawback in that the estimation of attenuation is prone to error. As such, the operating point cannot be determined with accuracy.

Accordingly, there is a need for a more accurate technique for determining the operating point of a satellite transponder amplifier. Further, it may be desired to control the power level of the amplifier in response to the measured operating point so as to ensure that the retransmitted signals are not overly compressed. It is to these ends that the present invention is directed.

SUMMARY OF THE INVENTION

The invention is a method and apparatus for monitoring and controlling the operating point of a satellite transponder amplifier. In one aspect of the invention, a time domain signal received at a ground station is digitally sampled. Then, a histogram of the received signal is computed. To form the histogram, the digital samples are categorized according to which of a plurality of amplitude ranges each sample falls within. When plotted as a graph, the number of occurrences within each amplitude range forms the histogram. Under low compression levels, the histogram generally appears as an approximately bell-shaped curve. However, under higher compression levels, the bell-shaped curve becomes distorted. By correlating the acquired histogram to a template histogram, an amount of compression can be determined. This amount of compression indicates the operating point of the transponder amplifiers. If desired, the transmission power levels used by the satellite can be adjusted to ensure that the amplifiers operate at desired levels of compression. The invention has an advantage over prior techniques in that the operating point of the transponder amplifiers can be more accurately determined. As such, the operating point can be more precisely adjusted.

DETAILED DESCRIPTION OF A PREFERRED EMBODIMENT

Overview

Figure 1:
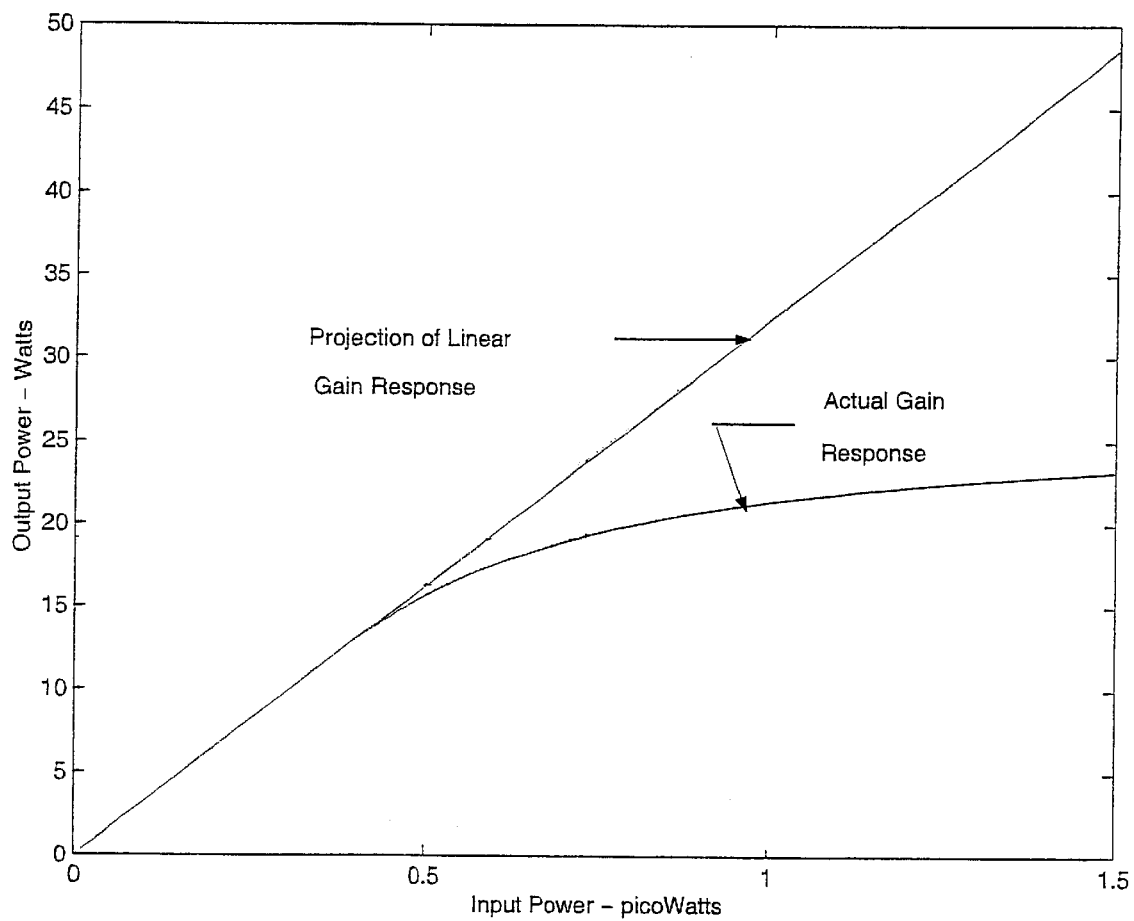
FIG. 1 illustrates a gain compression characteristic of the prior art.
Figure 2:
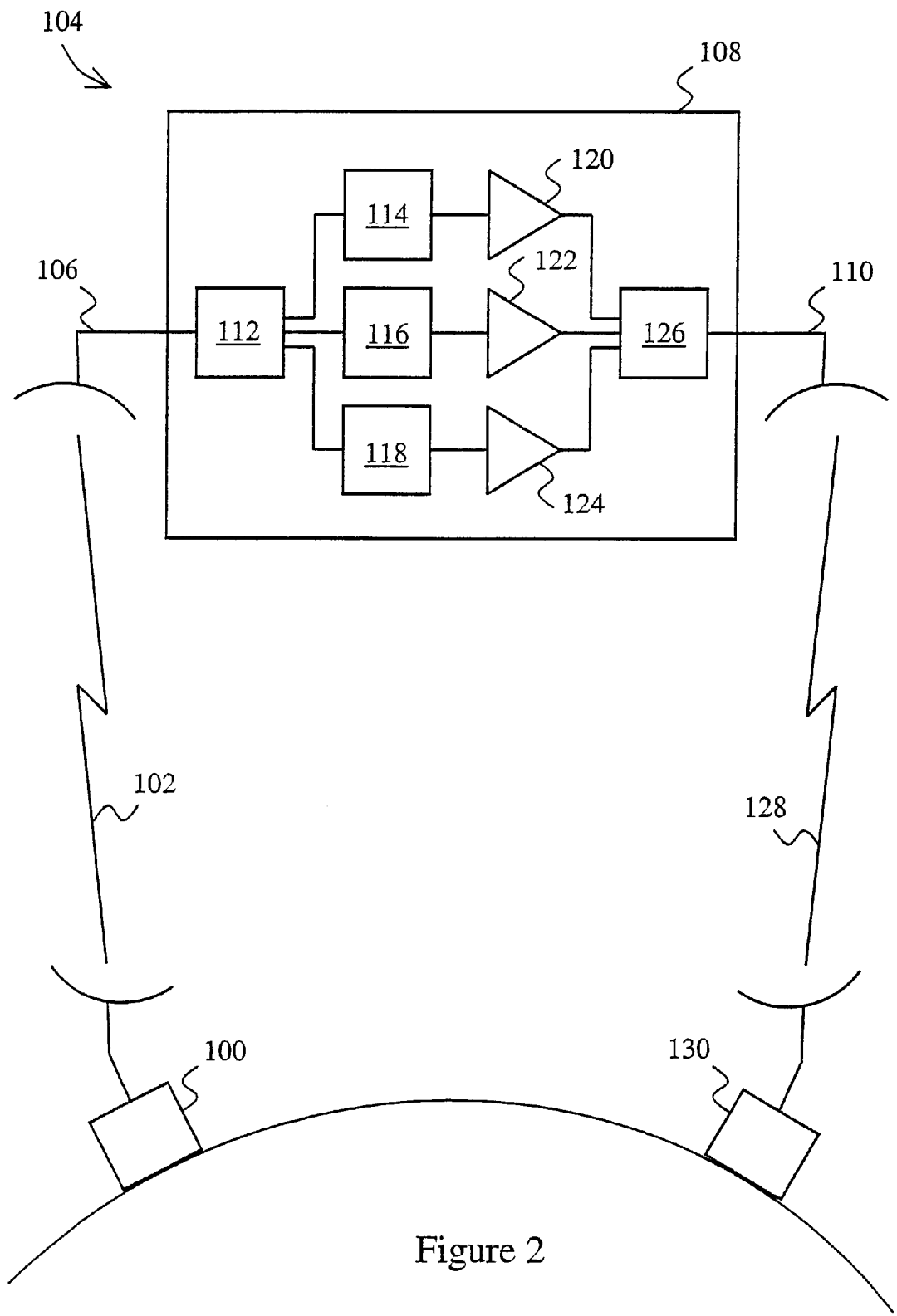
FIG. 2 illustrates a satellite system in which the present invention may be implemented.

FIG. 2 illustrates a satellite system in which the present invention may be implemented. As shown in FIG. 2, a ground station 100 may transmit an uplink signal 102 to a satellite system 104. The satellite 104 may include a receiving antenna 106, a transponder 108, and a transmitting antenna 110. The uplink signal 102 may be received by the antenna 106 and passed to the transponder 108. Within the transponder 108, a demultiplexer 112 may divide the received signal into the individual carrier signals.

From the demultiplexer 112, the carrier signals may be processed, such as by filters 114, 116 and 118 and amplified by amplifiers 120, 122 and 124. The individual signals may then be combined by multiplexer 126 and passed to the antenna 110 for retransmission via downlink 128. A ground station 130 may receive the signals from the downlink 128.

It will be understood that the satellite system 104 of FIG. 2 may be conventional. As such, modifications may be made to the transponder 108 while achieving advantages of the present invention. For example, FIG. 2 shows components for processing three individual carrier signals, however, it will be understood that components may be provided for processing a different number of carrier signals. Similarly, it will be understood that the satellite system 104 may include multiple transponders 108.

Figure 3:
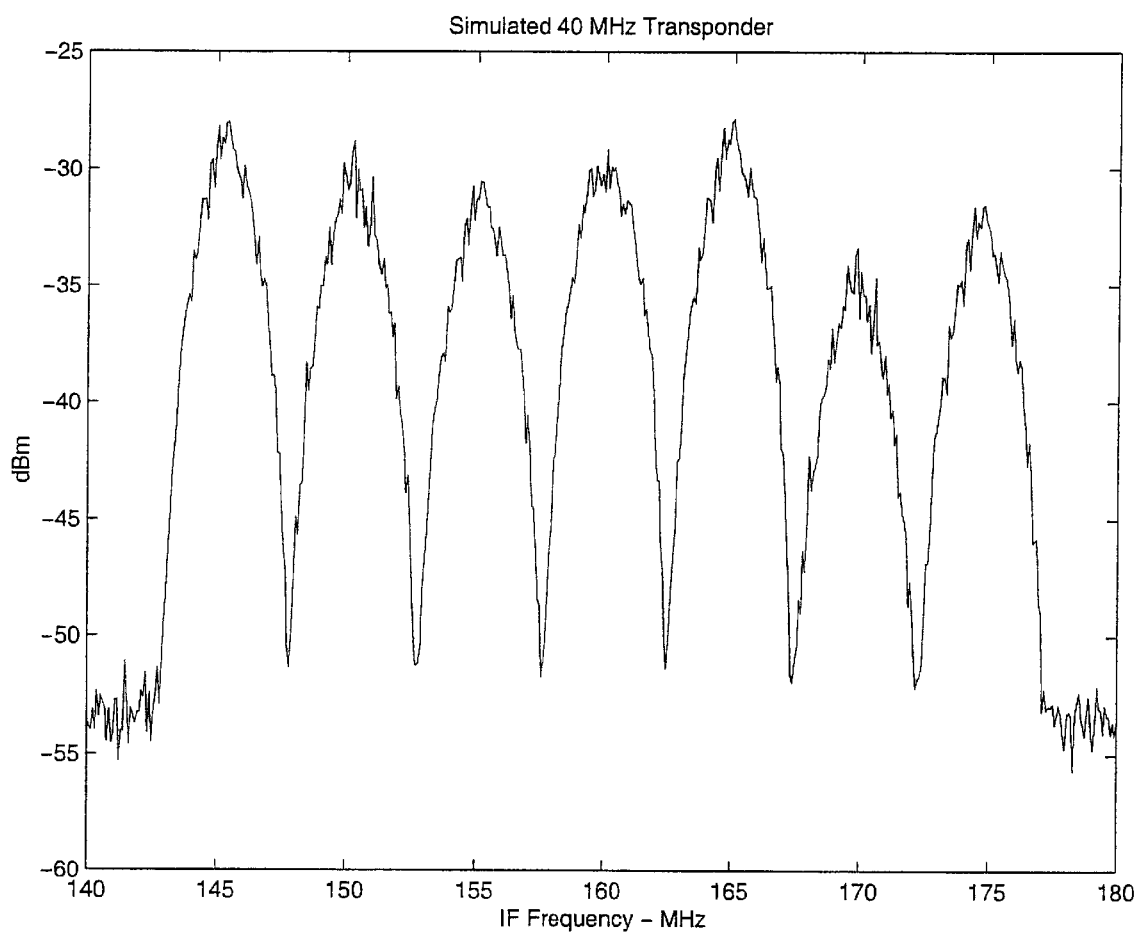
FIG. 3 illustrates exemplary signals transmitted from the transponder of FIG. 2.
Figure 4:
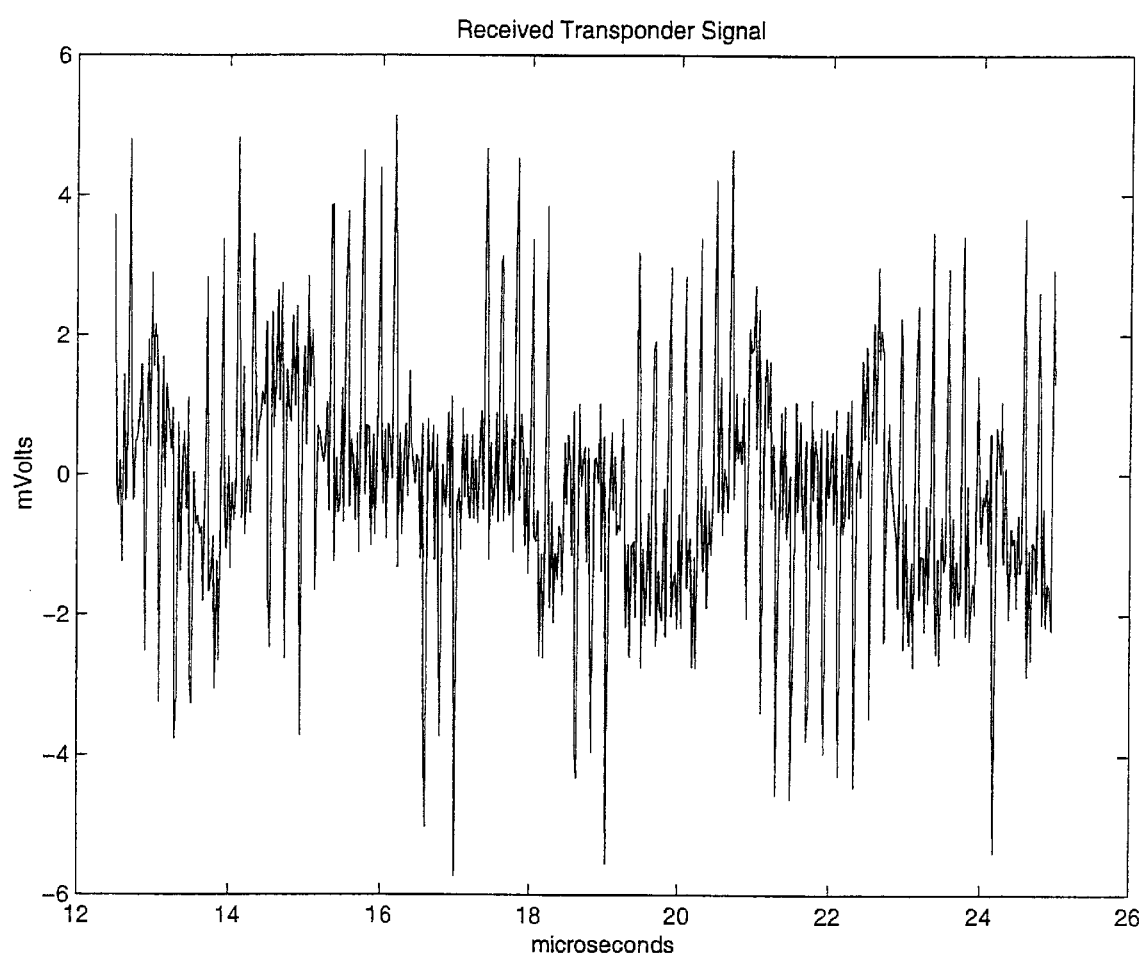
FIG. 4 illustrates the time domain equivalent of the signals of FIG. 3.

FIG. 3 illustrates exemplary signals transmitted from a satellite transponder, such as the transponder 108 of FIG. 2. As shown in FIG. 3, a 40 MHz transponder may be loaded with seven different signals of varying signal-to-noise ratios (SNR) and carrier frequencies. FIG. 4 illustrates the time domain equivalent of the signals of FIG. 3. In other words, FIG. 3 represents the power spectral density of the signal in FIG. 4. By inspection of the time domain signal of FIG. 4 it can be seen that the data is not constant modulus. A single phase shift-keyed (PSK) signal may be constant modulus, however, when multiple PSK signals are added together, the result is generally not constant modulus. Further, the signal appears somewhat random. In theory, if an infinite number of signals with different SNR's and bandwidths were added together, the distribution of the data samples would be "white" or normally distributed. Also, if the voltages in FIG. 4 were to be limited or compressed, this would substantially alter the statistical distribution of this signal. For example, if the output voltage in FIG. 2 were to limited to +/−2 mV, the tails of the distribution would grow in magnitude.

Figure 5:
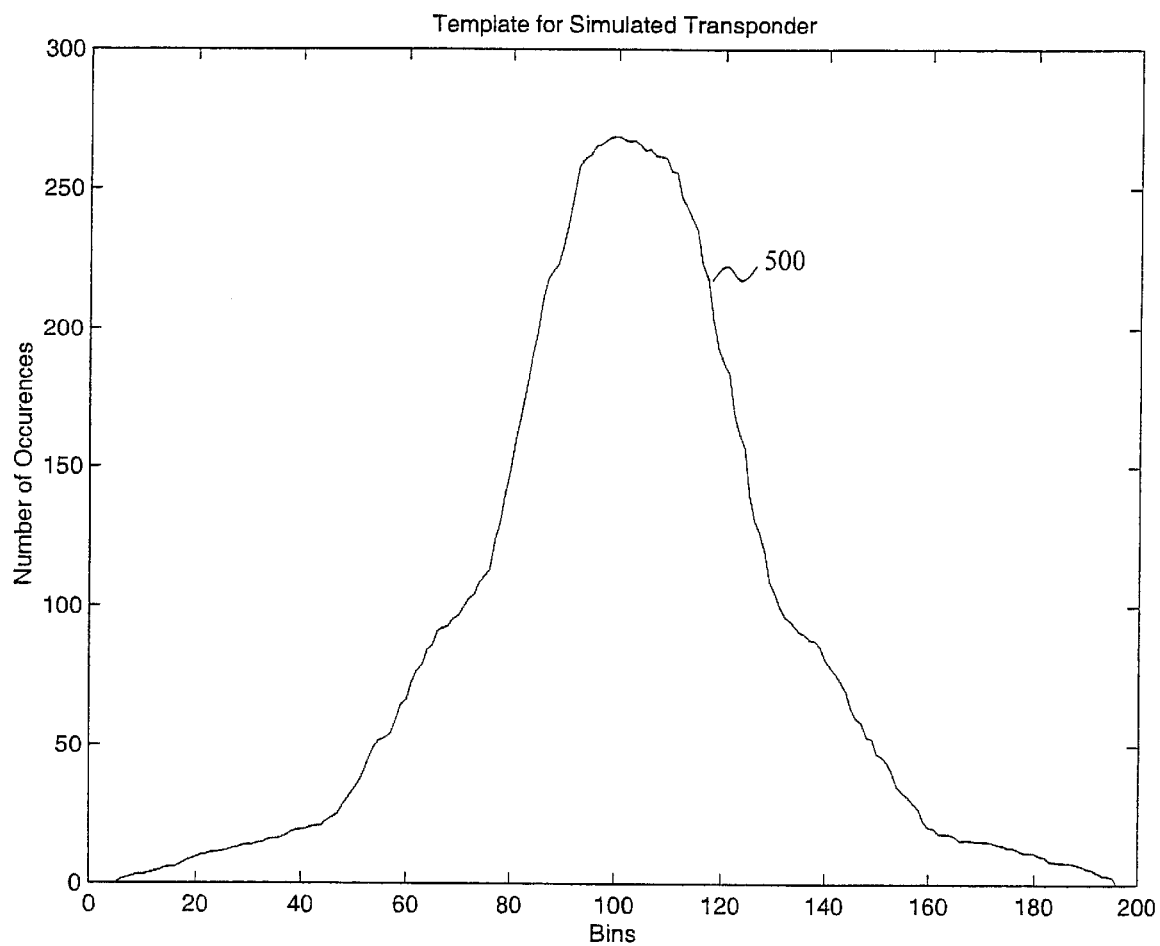
FIG. 5 illustrates an exemplary histogram of the time domain signals shown in FIG. 4.

FIG. 5 illustrates an exemplary histogram 500 of the time domain voltages shown in FIG. 4. This histogram 500 may be formed by digitally sampling the time domain signals of FIG. 4 and dividing the range of amplitudes into a plurality (e.g., 200) of equal ranges or "bins." Then, the number of samples that fall into each bin may be counted. Thus, FIG. 5 illustrates the distribution of sample amplitudes that fall into the bins. The distribution of FIG. 5 is not quite normally distributed, however, is does have a "bell"-like shape. Accordingly, the histogram 500 exemplifies a transponder whose amplifiers are operating substantially in the linear range.

Figure 6:
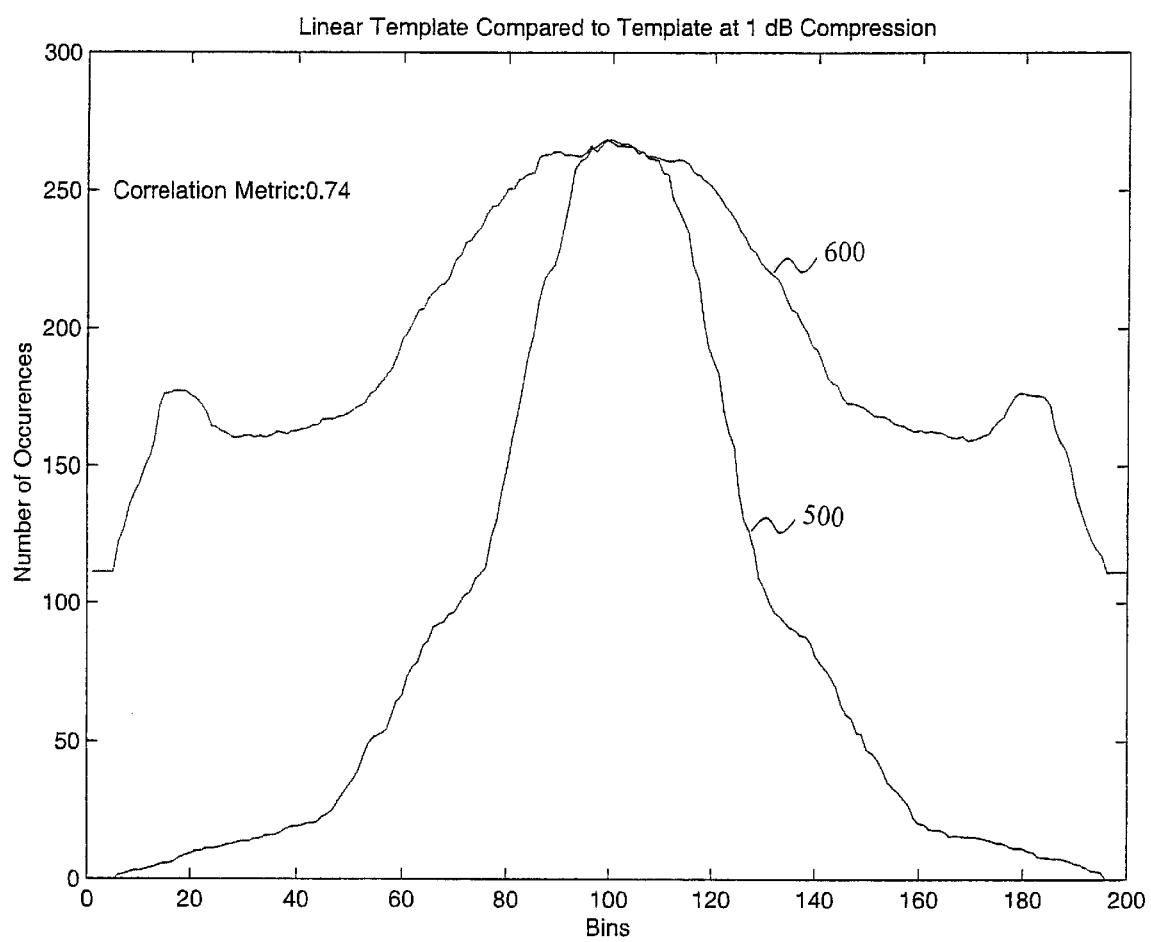
FIG. 6 illustrates the histogram of FIG. 5 along with a different exemplary histogram resulting from gain compression.

Assuming that the output voltages are limited, such as occurs when the amplifiers of the transponder operate further into the non-linear region, the histogram will be different from that of FIG. 5. FIG. 6 illustrates the histogram 500 of FIG. 5 along with a different exemplary histogram 600. The histogram 600 may result from limiting the voltages of the transponder signals of FIG. 4. The histogram 600 may be normalized such that its peak level is equal to that of the histogram 500. From FIG. 6, it can be seen that the distribution 600 has changed from the substantially "bell" shaped-curve of the histogram 500. Particularly, the tails of the distribution have grown dramatically in magnitude.

By correlating the two histograms, the operating point of the transponder amplifiers may be determined. For example, a correlation metric may be formed that is representative of differences between the two histograms 500 and 600. This correlation metric may then be indicative of the operating point of the transponder amplifiers.

OPERATING POINT DETERMINATION

Determining a transponder operating point is important to processes by which power is controlled in a satellite communication system and to ensure the quality and integrity of the underlying communications traffic and content. The power control processes are necessarily imprecise unless the current operating point of the transponder is known for each upward or downward power adjustment. The inventive power control process uses direct measurements from the spectrum monitoring system (SMS) present in a receiving ground station of most satellite communication systems to determine the operating point of the transponder during each power adjustment.

The algorithm for determining the transponder operating point may use up to three principal pieces of data to determine the operating point. This data may include a transponder compression index based on direct measurement from the SMS; a transponder downlink effective isotropically radiated power (EIRP) as measured from the SMS; and a predicted operating point from a transponder gain curve.

These three data may be combined together to determine the operating point of the transponder at any given time. The gain curve may be used only as a frame of reference. The transponder downlink EIRP measurement can provide a fairly reliable indicator of the transponder operating point. However, the accuracy of this measurement is influenced by many factors including such things as site calibration, antenna pointing accuracy and local weather conditions. This metric (downlink EIRP) will not generally be sufficient by itself to determine the operating point of the transponder. The transponder compression index is a very reliable measurement and is insensitive to power errors caused by incorrect calibration values and antenna pointing problems.

FORMING THE TEMPLATE HYSTOGRAM

The transponder compression index may be calculated by forming a histogram of the downlink transponder signal. This time domain process may be performed directly on the received voltage of the downlink transponder signal. As mentioned, if the transponder is working in its linear region, the transponder histogram will have a "bell like" distribution function. If the transponder is completely loaded with a variety of signals, this density function will approach that of a normal distribution. As the transponder begins to move from the linear to non-linear region, this distribution function changes from a single-hump bell-like function to a multi-hump "camel-back" function. When the transponder is operating in a non-linear region, the output voltage will be compressed. As the compression increases, the tails of the "bell distribution" begin to appear as humps on the edges of the distribution.

Figure 7:
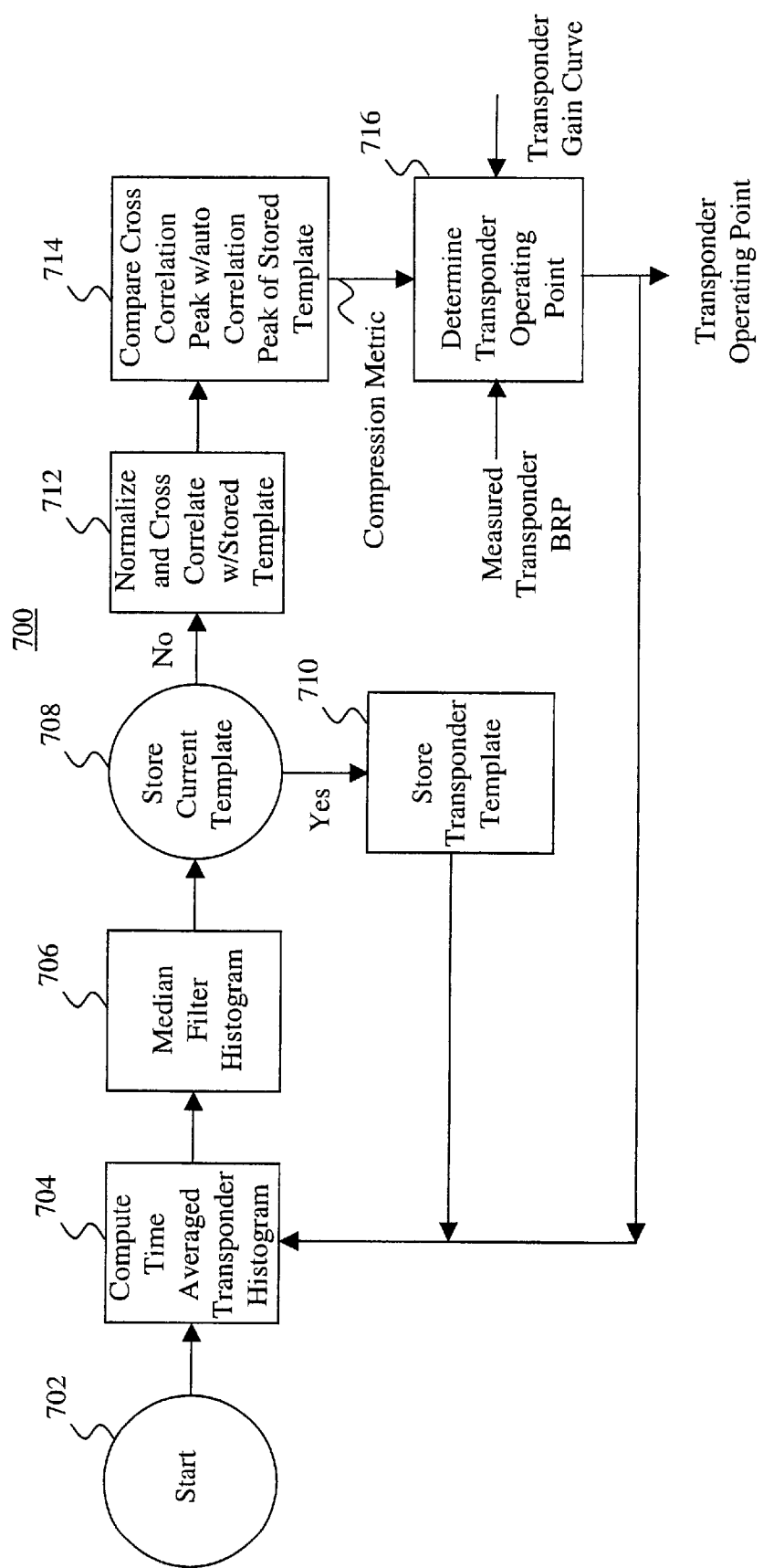
FIG. 7 illustrates a flow diagram for determining the operating point of a satellite transponder.

FIG. 7 illustrates a flow diagram 700 for determining the operating point of a satellite transponder. A satellite ground station, such as station 130 of FIG. 2, may be controlled in accordance with the flow diagram of FIG. 7. For example, a software program stored in the ground station may cause elements of the ground station, such as general-purpose computer system, to perform the steps of the flow diagram 700. Alternately, hardware or a combination of hardware and software may perform the functions indicated by FIG. 7. For example, a hardware system located in a ground station may include various stages that approximate the functions indicated in FIG. 7. As such, FIG. 7 may also illustrate a block schematic diagram of a system 700 of such hardware or combination of hardware and software.

Program flow begins in a start block 702. From the block 702, program flow moves to a block 704. In the block 704 a histogram may be formed that is indicative of then-current transponder operation. For example, this may include performing (radio-frequency) RF down-conversion to an intermediate frequency (IF). In addition, the IF signal may be filtered, such as by an anti-aliasing filter. Analog-to-digital conversion may then be performed on the down-converted IF signal. In a preferred embodiment, the analog-to-digital conversion is performed on the received time domain signal and under automatic gain control (AGC) to ensure that the conversion does not introduce clipping in the digital samples of the received signal. When digitizing the signal, care should be taken to prevent the A/D from clipping the signal. If the A/D clips, it would be difficult to distinguish between the effects of gain compression and the A/D clipping. Accordingly, this problem is addressed by using automatic gain control to prevent the A/D from clipping while the signal is being digitized.

The signal sampled in the block 704 may include multiple carrier signals received from the transponder 108 (FIG. 2) or may include only one carrier signal. Further, while the present invention may be most advantageously used for monitoring downlink gain compression, some advantages may be obtained by employing the invention, with appropriate modifications, for monitoring gain compression in the uplink 102 (FIG. 2).

The digital samples may then be stored in a machine readable memory device in block 704 as a "snapshot" of the received signal over a limited time period. For example, the received signal may be sampled for a predetermined time period of 10–20 microseconds. However, another time period may be selected.

Then, the stored samples may be categorized into "bins." More particularly, the total amplitude range of the samples may be divided into a plurality of smaller, equal amplitude ranges. For example, if the total range of amplitudes is 12.0 millivolts, then this range may be divided into two hundred "bins" of 0.06 millivolts (mV) each. Thus, the first bin would include all samples between 0.00 and 0.06 mV. The second bin would include all samples between 0.06 and 0.12 mV and so forth with the two-hundredth bin including all samples between 11.94 mV and 12.00 mV. It will be apparent that another number of bins may be selected.

Under most circumstances, a series of histograms are averaged together to generate a smooth rendering of the histogram. Accordingly, this process of obtaining samples over the predetermined time period may be repeated a number (N) times and the results averaged to obtain a time-averaged histogram. For example, the following formula may be used to create the averaged transponder histogram:

$$TH = 1/N \Sigma Thi$$

Where Thi is a single histogram and TH is the transponder histogram is created by averaging N histograms. This averaging step is analogous to a Bartlett Periodogram, except the output is a signal histogram rather than a power spectrum, and may be done using the SMS and its hardware platform.

Figure 8:
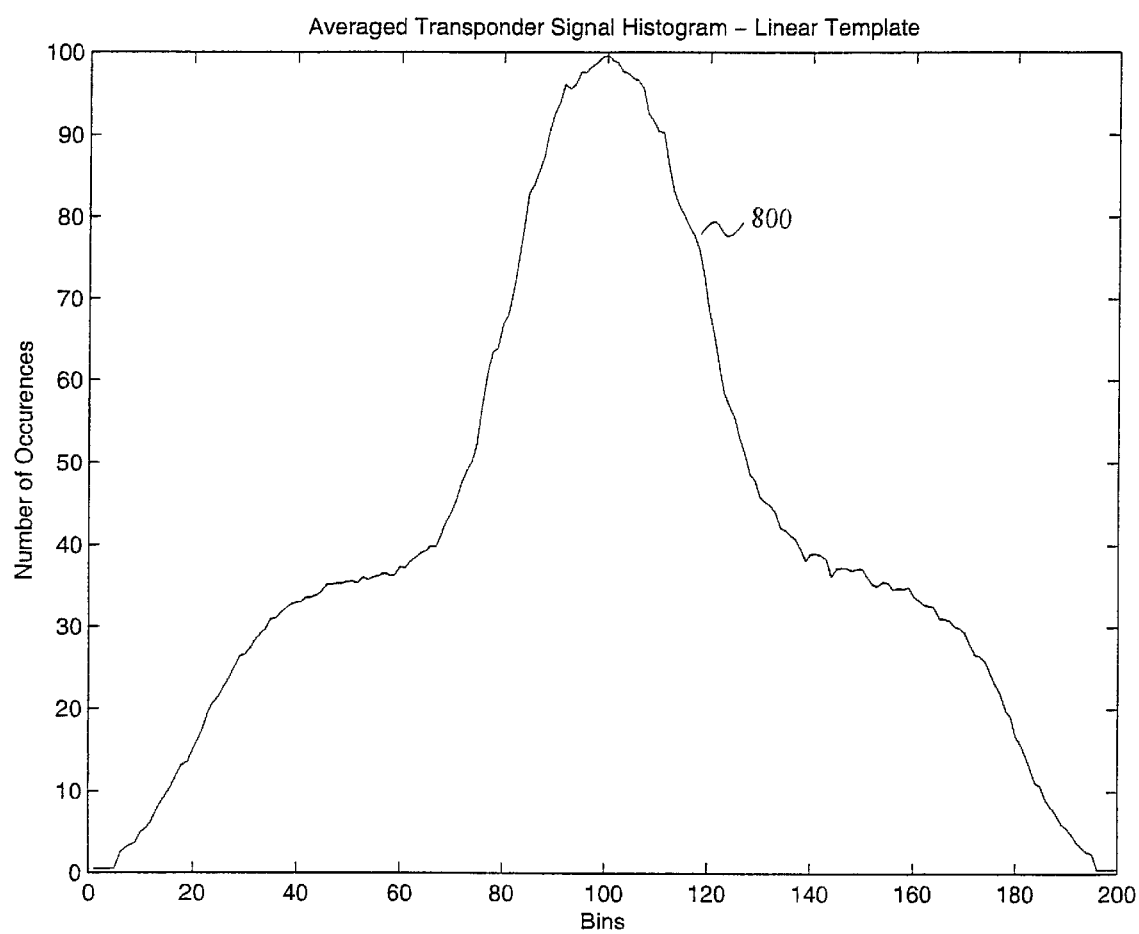
FIG. 8 illustrates an exemplary averaged histogram that may be used as template.

FIG. 8 illustrates an exemplary averaged histogram 800 that may be obtained in the block 704. This histogram may be created by synthesizing multiple signals on a band-limited transponder. Each synthesized signal may be quadrature phase shift keyed (QPSK) modulated and had a receive SNR of between 10 and 18 dB. The received signal voltage was histogramed into 200 different bins.

From the block 704, program flow moves to a block 706. In the block 706, the averaged histogram TH may be median filtered. A median filter may be used to perform additional smoothing on the averaged signal histogram. A median filter is preferred over other filters since tends to preserve the shape of histogram while smoothing it.

From the block 706, program flow moves to a block 708. In the block 708, a determination may be made as to whether the histogram obtained in the steps 704 and 706 is to be stored in a memory device as a template that may be used for comparison to later-acquired histograms. For example, during the steps 704 and 706, the transponder amplifiers may be set to low power level that is known to be within the linear region of operation. Alternately, plural templates may be obtained under gain compression at various known operating points. Assuming that the current histogram is to be stored as a template, program flow moves to a block 710 in which the current histogram may be stored as the template.

It is expected that a new template would need to be stored infrequently. For example, a new template may be obtained and stored after alterations are performed to the satellite system, such as adding or inactivating individual carrier signals for a transponder. As another example, a new template may be obtained periodically, such as daily, weekly or monthly.

FORMING ADDITIONAL MEASUREMENT HYSTOGRAMS AND THE COMPRESSION INDEX

Once a template has been appropriately stored in the block 710, program flow may return to the block 704. A new histogram may then be obtained in the block 704, median filtered in the block 706 and stored in memory. Then, in the block 708, if the newly acquired histogram is to be correlated to the stored template, program flow moves from the block 708 to a block 712.

In the block 712, the newly acquired histogram may be correlated to the stored template. As mentioned, gain compression tends to causes the shape of the histogram to change. FIGS. 9–13 illustrate exemplary acquired histograms 900, 1000, 1000, 1100, 1200, 1300, respectively, along with the template histogram 800 of FIG. 8.

Figure 9:
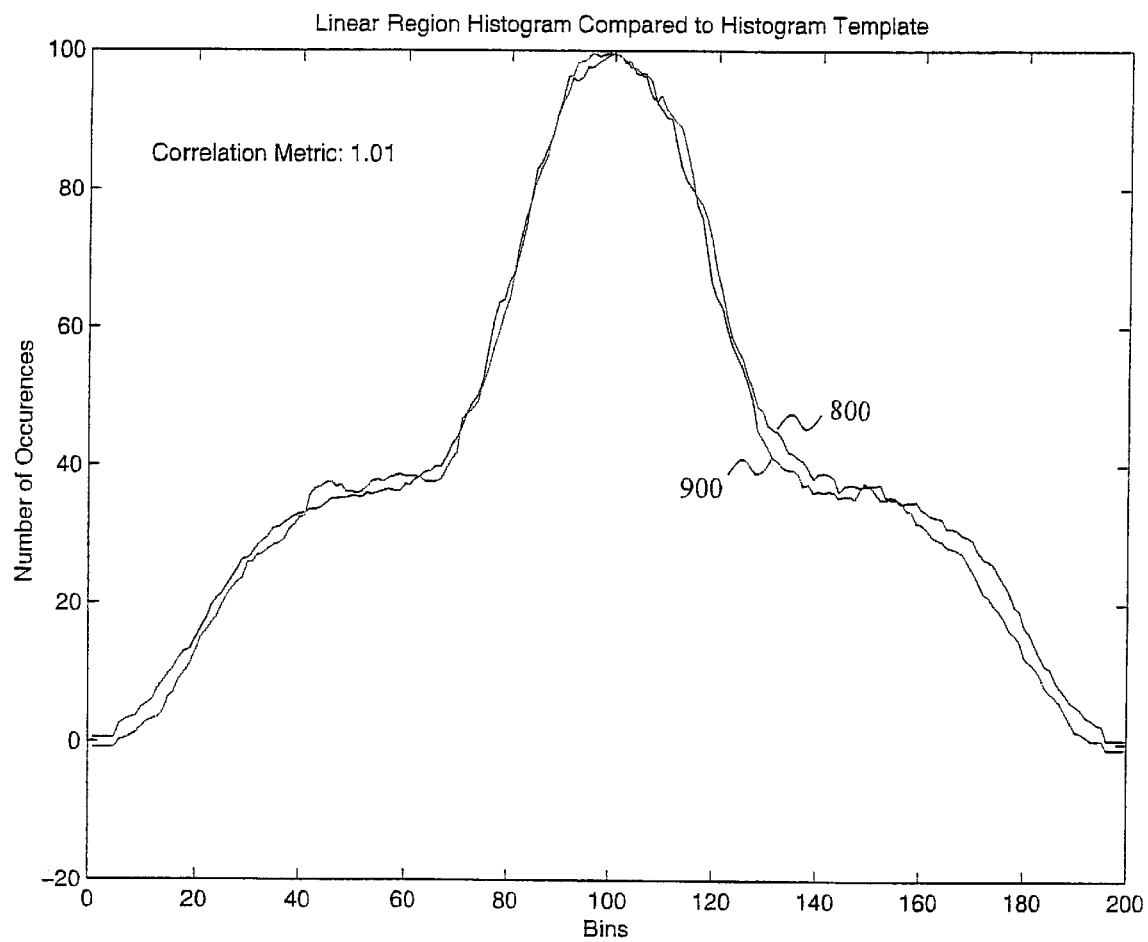
FIGS. 9–13 illustrate exemplary acquired histograms along with the template histogram of FIG. 8.
Figure 10:
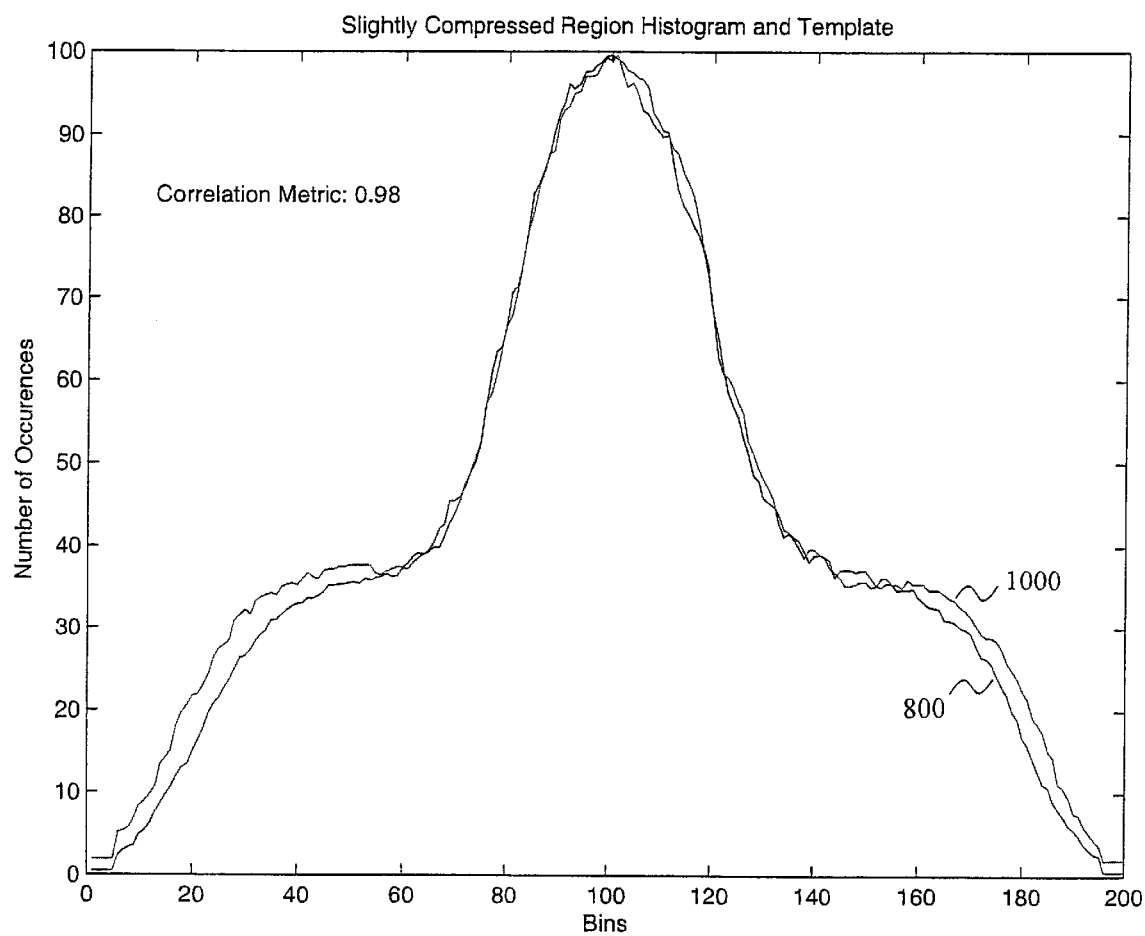
Figure 11:
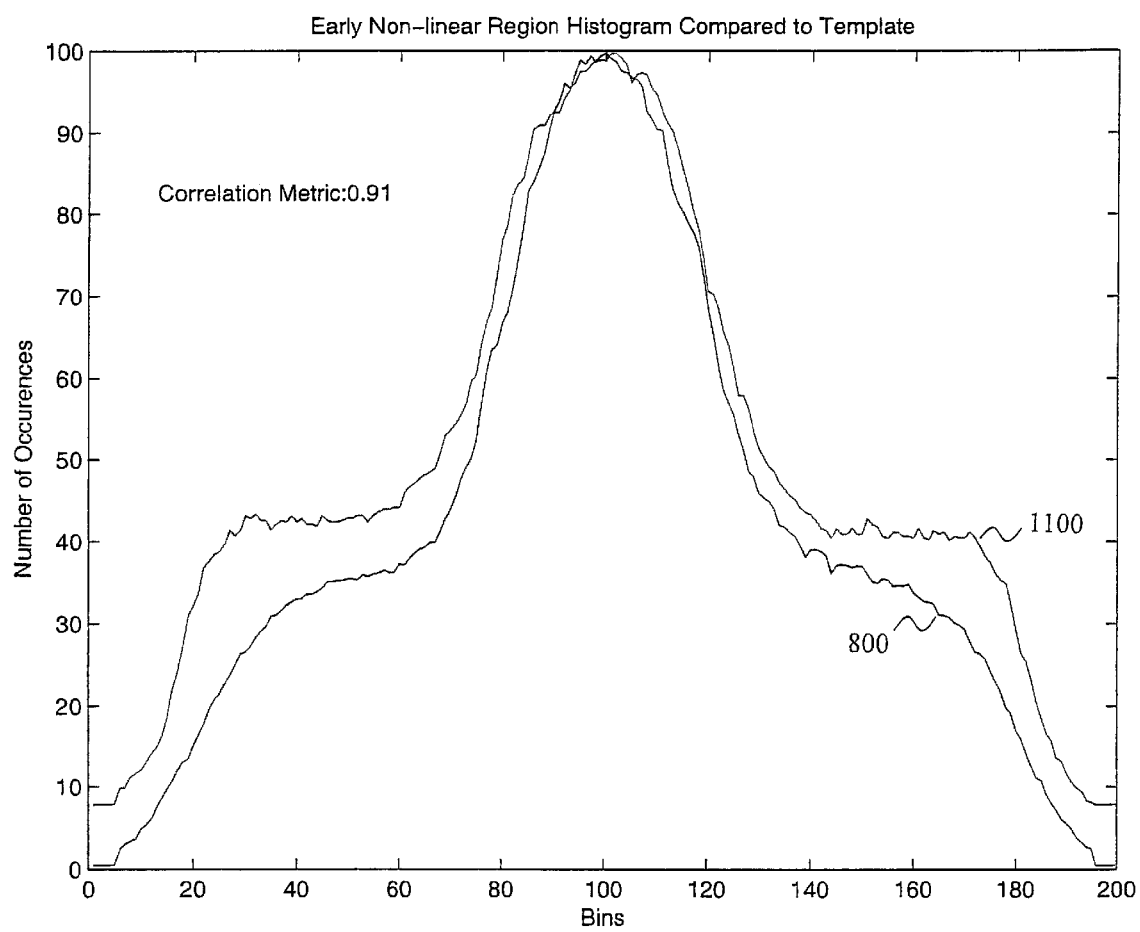
Figure 12:
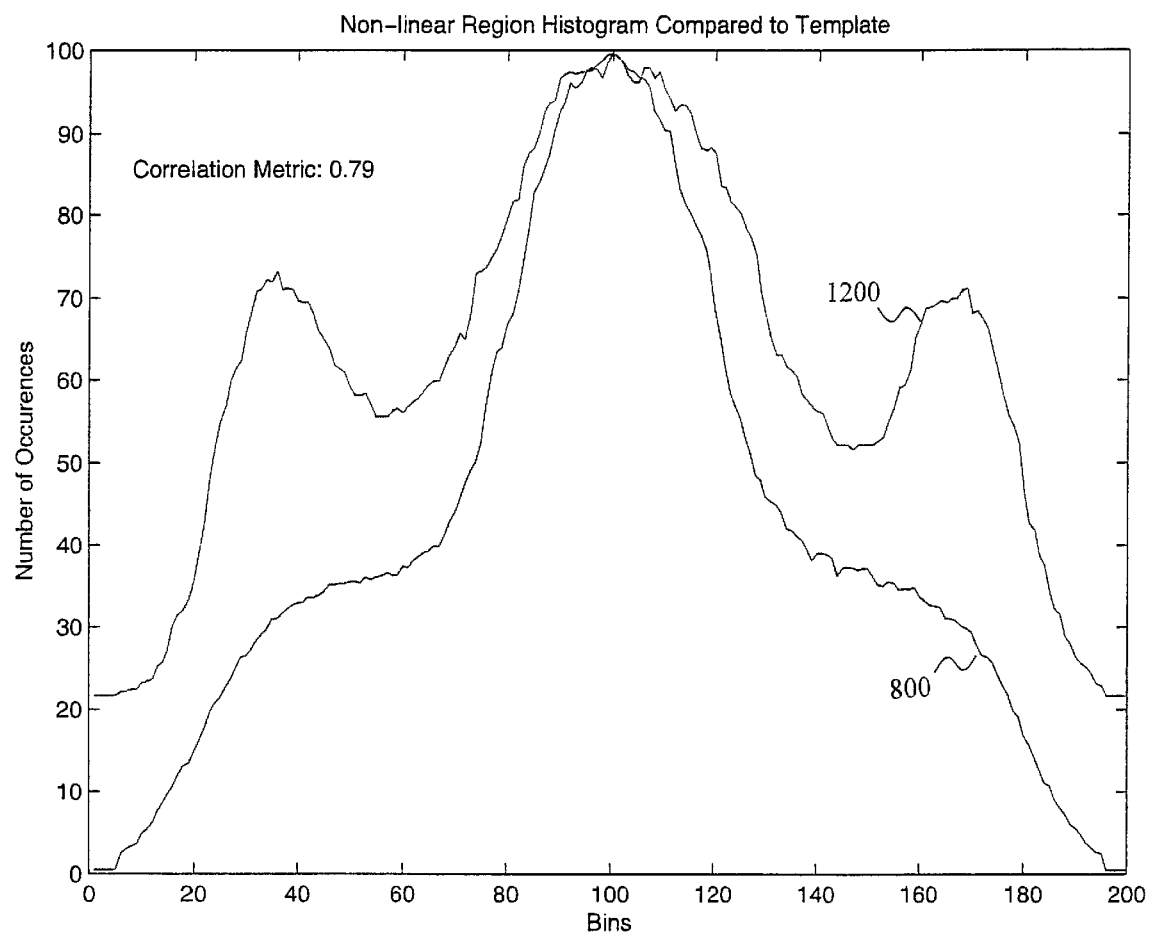
Figure 13:
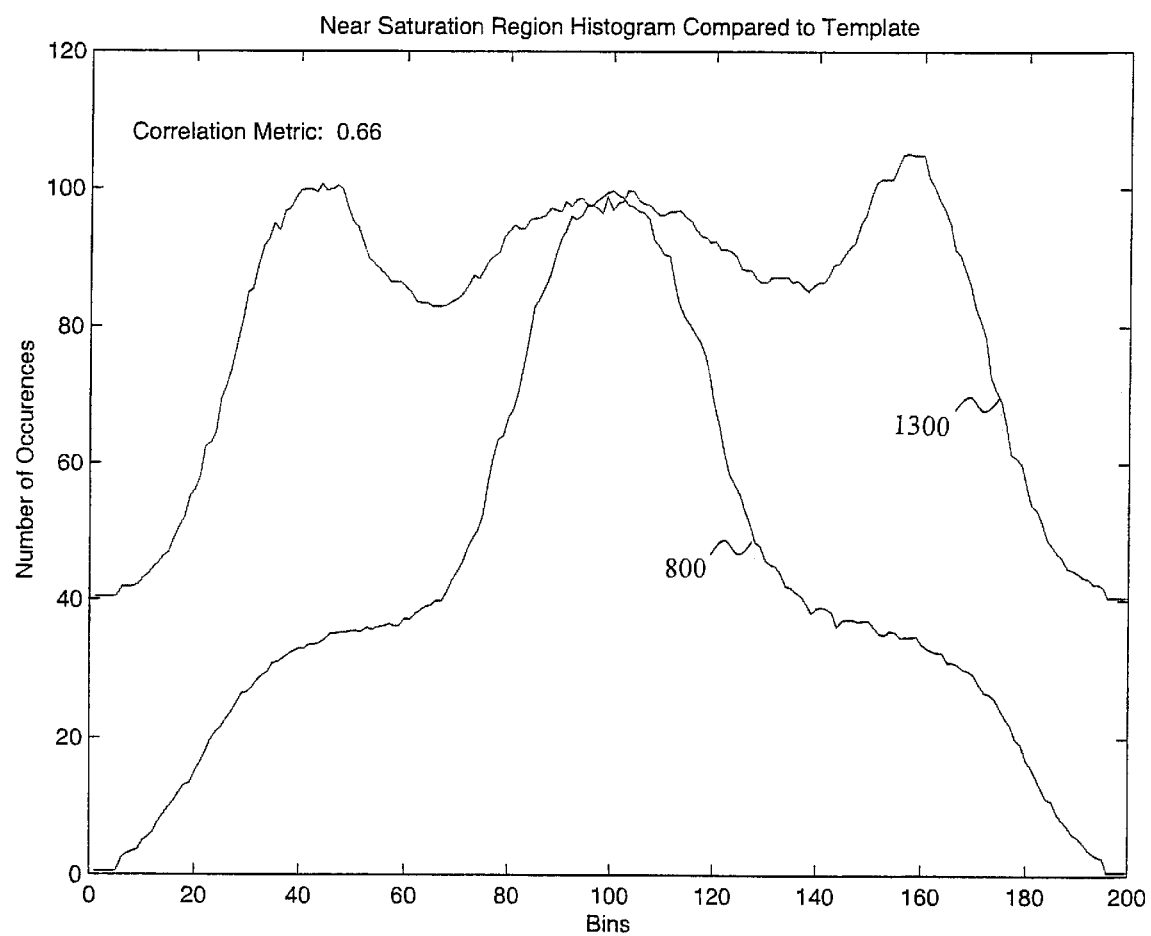

If the current histogram results from operation in the linear region, then the current histogram would be expected to be similar to the template 800. This is shown in FIG. 9, in which the current histogram 900 is similar to the template 800 and results in a compression metric that is close to unity (i.e. 1.01). However, if the current histogram results from operation further into the non-linear region, then the current histogram would be expected to dissimilar from the template. This is shown progressively in FIGS. 10–13, in which the current histograms 1000, 1100, 1200, and 1300 respectively are increasingly dissimilar from the template 800.

The compression metric indicates the degree of similarity between the current histogram and the template. Thus, as a result of increased levels of gain compression in the FIGS.

Figure 14:
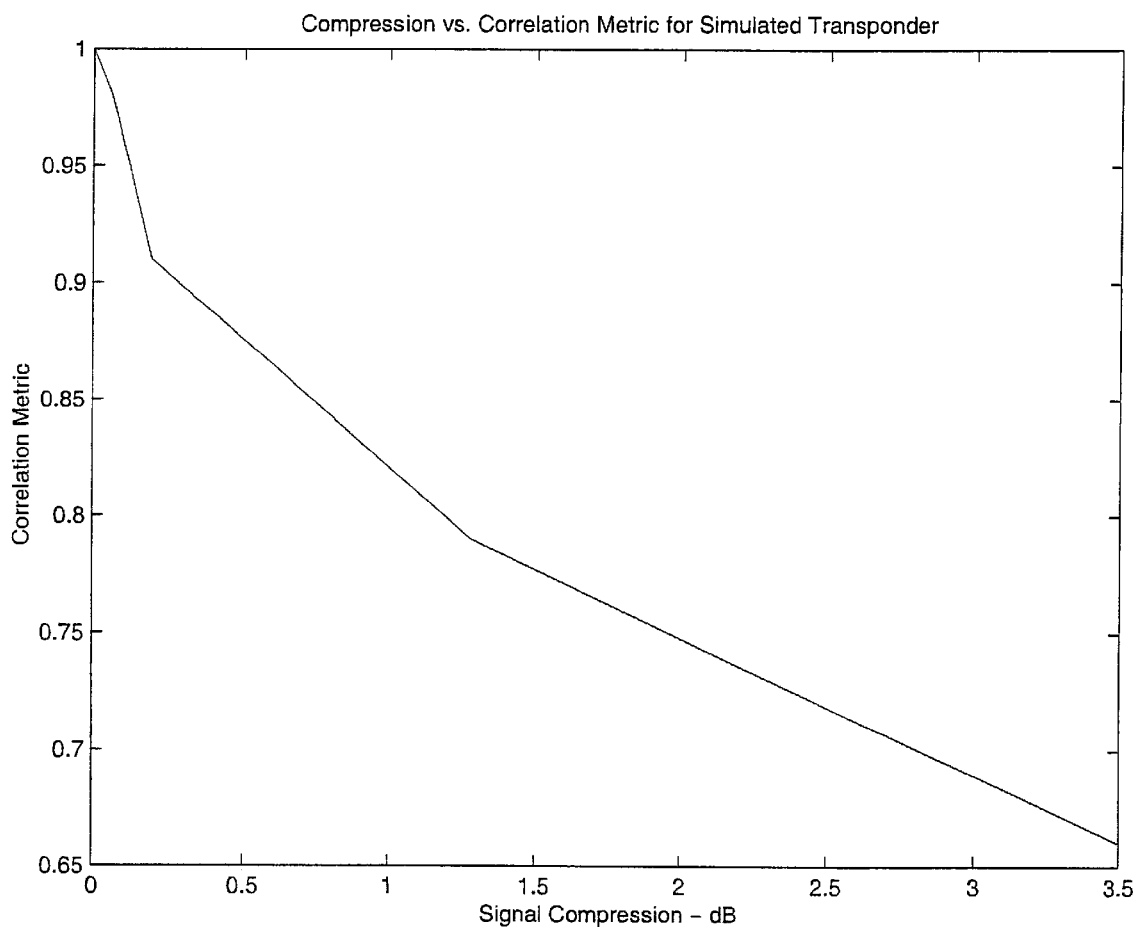
FIG. 14 illustrates a graph showing gain compression vs. the correlation metric for an exemplary transponder amplifier.

10–13, the compression metric progressively falls to 0.98, 0.91, 0.79, and 0.66, respectively. FIG. 14 illustrates a graph showing gain compression vs. the correlation metric for an exemplary transponder amplifier.

In the block 712, the template histogram and the current histogram may be normalized by making their amplitudes equal at the center bin of the two histograms.

Two quantities may then be computed by the system 700. A first quantity is an autocorrelation of the template, while a second quantity is a cross correlation of the template with the current histogram. From the block 712, program flow moves to a block 714. In the block 714 a ratio of the first and second quantities computed in the block 712 may be computed. The ratio of these two numbers yields a compression metric. This compression metric may be converted to decibels to yield the "compression index."

DETERMINING THE TRANSPONDER OPERATING POINT

Referring to FIG. 7, program flow moves from the block 714 to a block 716. In the block 716, the transponder operating point may be determined. A value used in the block 714 is a compression metric obtained by correlating the template histogram with a current histogram, such as the compression index. This value may be compared to a gain curve for the transponder amplifiers.

Figure 15:
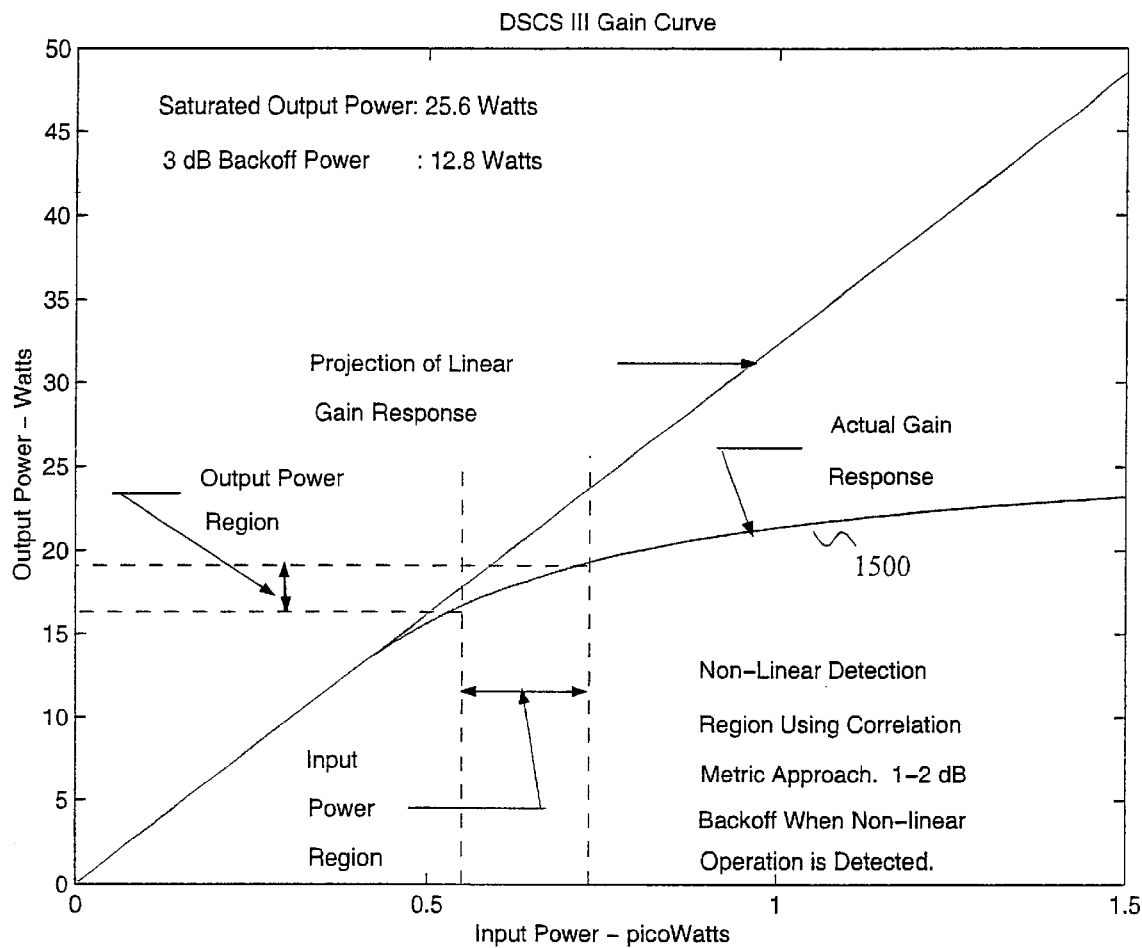
FIG. 15 illustrates an exemplary gain curve for a transponder amplifier.
Figure 16:
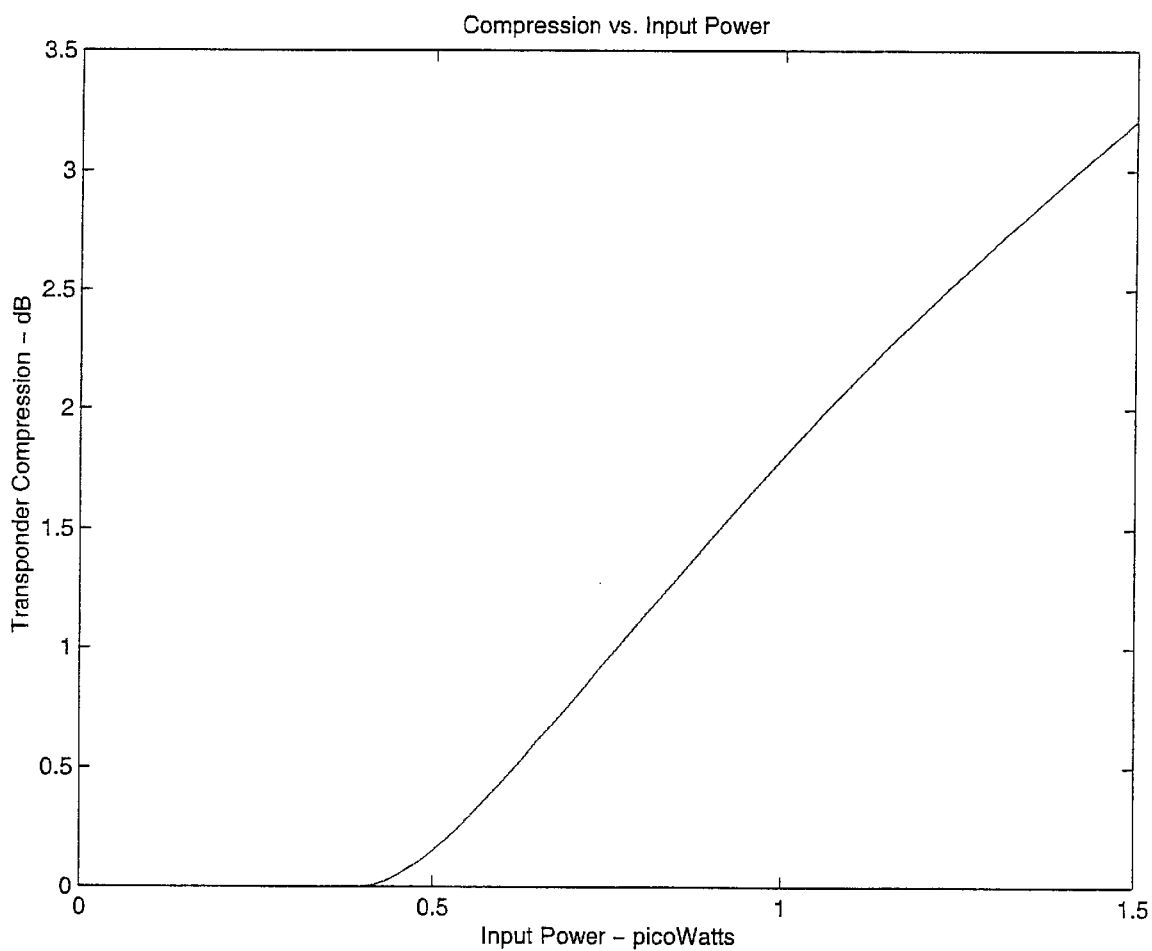
FIG. 16 illustrates an exemplary graph of transponder compression versus input power.
Figure 17:
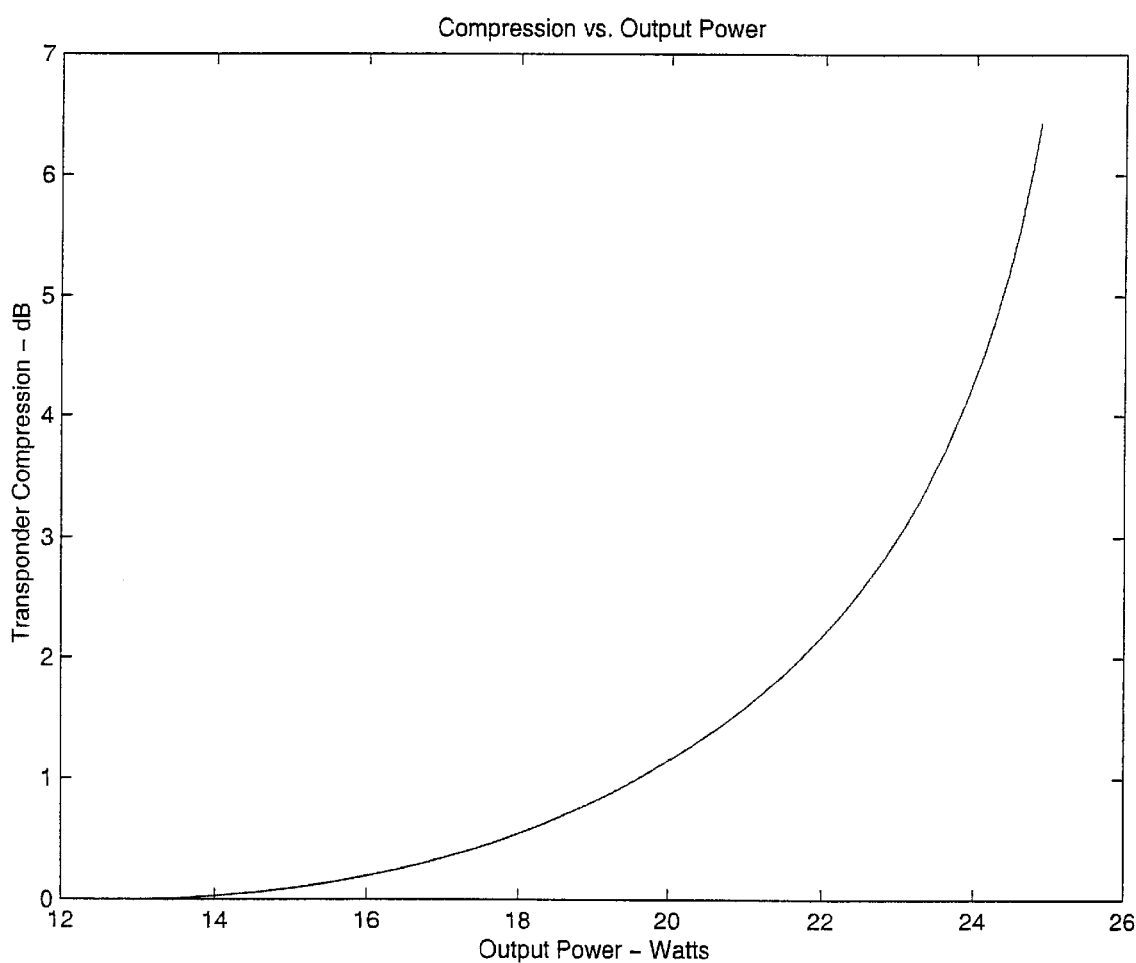
FIG. 17 illustrates an exemplary graph of transponder compression versus output power.

FIG. 15 illustrates an exemplary gain curve 1500 for a transponder amplifier. The curve 1500 may be a simulated defense satellite communications system (DSCS III) gain curve obtained using an approximation equation obtained from DSCS network planning system (DNPS). This curve 1500 shows the transponder response and the projected response if the transponder output response were linear for all inputs. A gain curve similar to that shown in FIG. 15 may be stored in memory by the system 700. This gain curve 1500 may be obtained experimentally or from specifications published by a manufacturer of the amplifier. The compression level is a different between the actual gain curve and the projection of a linear gain response, as shown in FIG. 15. Thus, by comparing the measured level of compression, it can be determined where on the gain curve 1500 the transponder amplifiers are currently operating. This is the operating point. FIGS. 16 and 17 show the transponder compression versus input power and output power respectively.

The regions enclosed by the dashed lines of FIG. 15 indicate where the correlation metric approach is expected to detect non-linear operation of the transponder. The lower lines indicate the earliest point where that the algorithm is expected to detect non-linear operation. The upper lines indicate the maximum boundary before detection. In other words, this approach will detect non-linear operation before the upper limit is achieved. Thus, if the compression index is low (e.g., less than 0.5 dB), this indicates that the amplifiers may be operating in the linear region of the gain curve 1500. The measured signal compression can be overlaid directly onto the transponder gain curve to determine the operating point. As such, a comparison of the compression index to the gain curve 1500 would not be expected to yield an accurate representation of the operating point. Thus, under these conditions, the transponder EIRP measured using conventional techniques may be used to estimate the current operating point of the transponder.

The computation of the transponder operating point can be a nearly instantaneous process. The downlink transponder EIRP and compression metric may be determined simultaneously by the SMS. This data may then be referenced to the gain curve of the transponder to determine its operating point.

In a preferred embodiment, the operating point is continuously monitored. Thus, once a current operating point is determined in the block 716, program flow may return to the block 704 and progress through again the blocks 706, 708, 712, 714 and 716. This process may be repeated, for example, as soon as an operating point is determined or periodically, such as once per second.

USING THE MEASURED OPERATING POINT TO DETERMINE OPTIMAL TRANSPONDER OPERATION

The output power of the transponder may be controlled in a closed loop link power control system. More particularly, power control implemented from the ground station 130 (FIG. 2) may be used to remotely adjust the transponder output power for the downlink 128. For example, the signal quality may be measured in the ground station 130. In response to a reduced signal quality, which may be caused by rain fade, the output power may be increased, such as by the ground station 130 sending a control signal to the satellite 104. Conversely, in response to an increased signal quality, the power output may be reduced without sacrificing signal quality.

If a low signal quality results in increasing the power too far into the non-linear region of the gain curve for the transponder amplifiers, further increases in power will not generally increase the signal quality. Rather, such increases may reduce the signal quality by increasing the signal compression and noise. Accordingly, the transponder operating point determined in the block 716 may be used to inhibit the closed loop from increasing transmission power beyond a predetermined level on the gain curve for the transponder amplifiers. For example, the measured operating point may be compared to this predetermined level, and if the operating point is at or above this predetermined level, then further increases in gain may be inhibited. Conversely, if the measured operating point is below this predetermined level, increases in gain may be permitted by the closed loop (e.g., when the measured signal quality is low). For each transponder, the operator or DSCS operational control subsystem (ODOCS) or another entity, can specify the maximum operating point of the transponder.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for determining a level of gain compression in a wireless transmitted signal, the method implemented by communications equipment and comprising steps of:

receiving a wireless transmitted signal wherein the transmitted signal is amplified by an amplifier prior to transmission;

sampling the signal, thereby forming a series a digital samples representative of the signal in the time-domain;

forming an acquired histogram of the samples;

correlating the histogram to a template histogram pre-stored in machine readable memory; and forming a correlation metric representative of similarity between the acquired histogram and the template histogram wherein the correlation metric is indicative of an amount of gain compression introduced into the wireless signal by the amplifier.

2. The method according to claim 1, further comprising inhibiting further gain compression based on the amount of gain compression thereby inhibiting signal quality deterioration caused by gain compression.

3. The method according to claim 2, further comprising controlling gain of the transmitted signal in a closed link power control loop based on received signal quality.

4. The method according to claim 1, wherein the signal is received by a ground station from a satellite transponder.

5. The method according to claim 1, wherein the signal is received by a satellite from a ground station.

6. The method according to claim 1, further comprising measuring effective isotropically radiated power when the gain compression is below a predetermined level and using the isotropically radiated power to determine an operating point of the amplifier.

7. The method according to claim 1, further comprising comparing the amount of gain compression to an amplifier gain curve to determine an operating point of the amplifier and, when the gain compression is lower than a predetermined level, using measured effective isotropically radiated power to determine the operating point.

8. The method according to claim 1, further comprising performing automatic gain control on the signal prior to said sampling.

9. The method according to claim 1, further comprising median filtering the samples of the wireless signal.

10. The method according to claim 1, further comprising forming the template histogram by obtaining samples of the signal.

11. The method according to claim 10, further comprising obtaining a plurality of template histograms.

12. The method according to claim 11, further comprising averaging the plurality of template histograms.

13. The method according to claim 10, wherein the samples for the template histogram are obtained while the amplifier operates in a linear region.

14. A system for determining a level of gain compression in a transmitted signal comprising communications equipment that controls gain of the transmitted signal in a closed link power control loop based on received signal quality and in which a histogram is computed from a received wireless transmitted signal and the computed histogram is correlated to a template histogram to determine the level of gain compression in the wireless transmitted signal, wherein the communications equipment inhibits further gain compression based on the amount of gain compression thereby inhibiting signal quality deterioration caused by gain compression.

15. The system according to claim 14, wherein the computed histogram is formed by the communications equipment sampling the transmitted signal in the time domain and determining a number of samples that fall into each of a plurality of amplitude ranges.

16. The system according to claim 14, wherein the communications equipment comprises a ground station that receives the signal from a satellite transponder.

17. The system according to claim 14, wherein the communications equipment comprises a satellite system that receives the signal from a ground station.

18. The system according to claim 14, wherein the communications equipment compares a level of gain compression to an amplifier gain curve to determine an amplifier operating point.

19. The method according to claim 18, wherein when the gain compression is lower than a predetermined level, effective isotropically radiated power is used to determine the operating point.

20. The system according to claim 14, wherein the communications equipment performs automatic gain control on the received signal prior to sampling the transmitted signal for computing the histogram.

21. The system according to claim 14, wherein the communications equipment median filters samples of the transmitted signal for computing the histogram.

22. The system according to claim 14, wherein the communications equipment forms the template histogram by obtaining samples of the transmitted signal.

23. The system according to claim 22, wherein the communications equipment obtains a plurality of template histograms.

24. The system according to claim 23, wherein the communications equipment averages the plurality of template histograms.

25. The system according to claim 22, wherein the communications equipment obtains the samples for the template histogram while the amplifier operates in a linear region.

* * * * *

UNITED STATES PATENT AND TRADEMARK OFFICE
CERTIFICATE OF CORRECTION

PATENT NO.   : 6,549,755 B2
DATED        : April 15, 2003
INVENTOR(S)  : Chu et al.

It is certified that error appears in the above-identified patent and that said Letters Patent is hereby corrected as shown below:

Column 3,
Line 54, replace "200" with -- 200 --

Column 6,
Line 10, replace "200" with -- 200 --
Line 38, replace "HYSTOGRAMS" with -- HISTOGRAMS --
Line 50, replace "causes" with -- cause --
Line 61, replace "to" with -- to be --

Column 7,
Line 39, replace "different" with -- difference --

Column 8,
Line 60, replace "a digital" with -- of digital --

Column 10,
Line 22, replace "method" with -- system --

Signed and Sealed this

Twenty-first Day of June, 2005

JON W. DUDAS
*Director of the United States Patent and Trademark Office*